Figure 1:
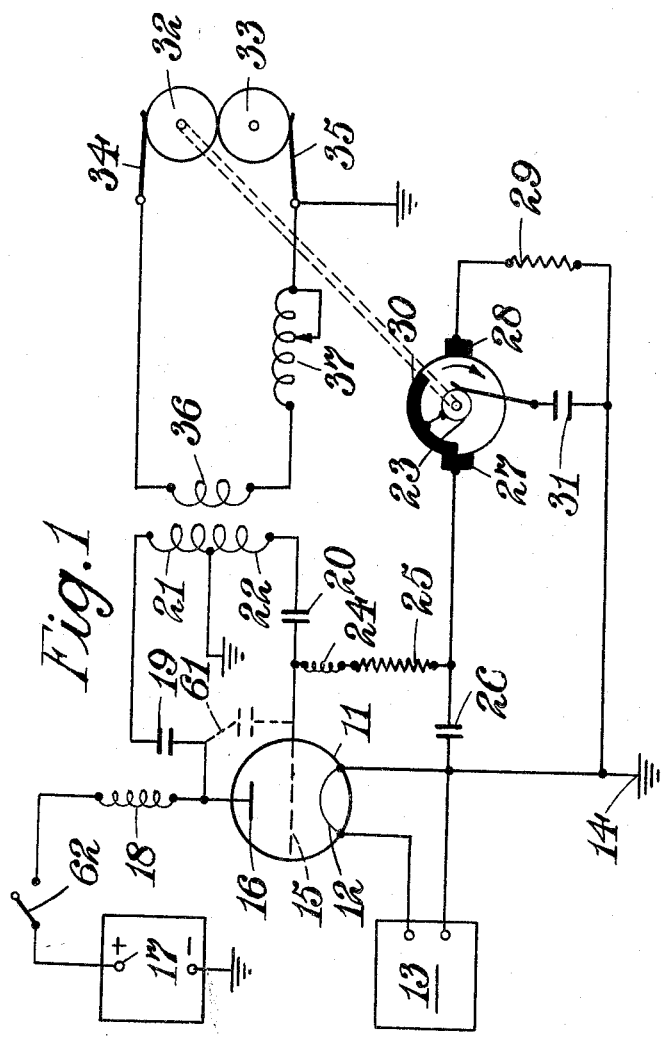

Sept. 28, 1954

M. R. MORITZ ET AL 2,690,495

SEAM WELDING OF THERMOPLASTIC SHEETS

Filed March 19, 1946

2 Sheets-Sheet 1

Inventors,
March R. Moritz and
Edward G. Autie
By Young, Emery & Thompson
Att'ys.

Sept. 28, 1954

M. R. MORITZ ET AL 2,690,495

SEAM WELDING OF THERMOPLASTIC SHEETS

Filed March 19, 1946

2 Sheets-Sheet 2

Inventors,
March R. Moritz and
Edward G. Autie
By Young, Emery + Thompson
Attys.

Patented Sept. 28, 1954

2,690,495

UNITED STATES PATENT OFFICE 2,690,495

SEAM WELDING OF THERMOPLASTIC SHEETS

March Rudolph Moritz and Edward George Autie, London, England, assignors, by mesne assignments, of one-half to United Shoe Machinery Corporation, Flemington, N. J., a corporation of New Jersey, and one-half to Wickman Limited, Coventry, England, a British company Application March 19, 1946, Serial No. 655,456

Claims priority, application Great Britain March 19, 1945

10 Claims. (Cl. 219—10.53)

This invention relates to apparatus for heating materials by high frequency electrical energy.

The invention is specially applicable to the welding of sheets of thermoplastic material, e. g. polyvinyl chloride sheets, by high frequency electrical energy. Seam welding and spot welding of such material has been known for some years and are described in, for example, British patent specification No. 555,054.

In that specification it is pointed out (page 7, lines 40–49, page 11, line 127, to page 12, line 8, and claims 10 and 11) that the work (e. g. two sheets of thermoplastic material) may be moved in relation to fixed electrodes or vice versa. For example, the electrodes may be rollers. Putting this matter in another way, where it is desired to consolidate the joining surfaces of two sheets of thermoplastic material such as two sheets of a thermoplastic having a basis of polyvinyl chloride, or two sheets of a material having a basis of polystyrene, seam welding may be carried out by relative movement between the two contiguous sheets and the electrodes which are pressed on to the opposite sides of the contiguous sheets. For example the sheets to be joined may be moved by feed rollers in relation to electrodes which have no motion of translation or the electrodes themselves may be wheels or rollers which also constitute the feed rollers for the sheets. Since the date of British specification No. 555,054 (in August 1941) devices for carrying out seam welding of thermoplastic materials by applying an alternating electric field of high-frequency to welding electrodes have come into wide use. Some such devices have the general appearance of a sewing machine and the roller electrodes are arranged to be rotated (either mechanically or by the movement of the sheets engaged thereby) and the rollers are connected in an electrical circuit supplied with a current of very high frequency (radio frequency) so that an alternating electric field of high frequency is set up at the joining faces to enable these faces to be softened by heat and welded together.

In the practical use of such devices, for example in the making of containers, bags, garments, furnishings and the like from thermoplastic sheet materials which have to be joined together by "seam welding," it is often desirable or necessary to vary from one moment to another the speed at which the material is fed between the electrodes, for example at corners or bends or in the case of joints which are of intricate shape; indeed it is frequently necessary to stop the relative feed momentarily. Naturally if the relative movement of the sheets and the electrodes is carried out at a constant speed, it is desirable to deliver the high-frequency electric power to the electrodes at a constant rate and in that case each unit length of material fed between the electrodes is subjected to the same amount of heating (i. e. receives the same amount of electrical energy) and if the rate of delivery of heat is thus properly adjusted, the welded seam will be uniform in character along its length.

If, however, the rate of feed is varied but the electric power is delivered to the material at an invariable rate, the seam may receive less heat per unit length if the rate of feed is increased, and the welding may then be incomplete or ineffective; or the seam may receive excess heat per unit length if the rate of feed is reduced so that the seam may be overheated or burnt.

It is thus an object of this invention to provide novel apparatus whereby the heating of work moved in relation to energy applying means is uniform, irrespective of the speed of movement.

In the case where high-frequency electric energy is used for the welding of plastic sheets, it is an object of the present invention to allow for a varied rate of feed while still ensuring an evenly-welded seam without the necessity for readjusting the electric generator itself. A particular object of this invention is in the case of seam welding of thermoplastic materials by means of roller electrodes, to regulate the supply of energy to these electrodes in such a way that an evenly-welded seam is produced no matter what variations may take place in the rate of feed.

Broadly, the invention provides, in heating apparatus in which the work to be heated is moved past energy applying means supplied with high-frequency electrical energy, the combination of a high frequency, constant pulse-length, electrical pulse-generator, means for applying the output of said generator to said energy applying means, triggering means for said generator whereby pulse initiation is effected, and means controlled by the speed of movement of the work past said energy applying means for operating said triggering means at a repetition frequency substantially proportional to said speed.

Figure 2:
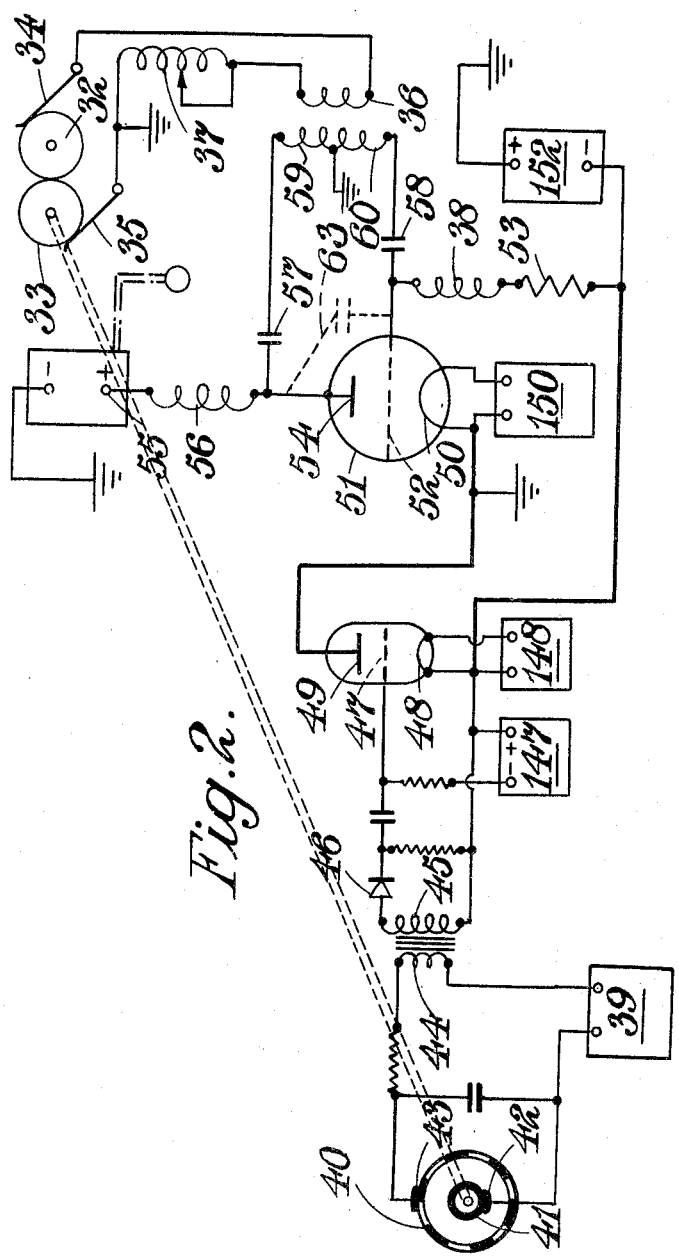

Figure 1 is a diagram indicating one electrical arrangement suitable for producing the pulses of electrical energy at a rate proportional to the speed of relative movement of the plastic sheets and the welding electrodes, and Figure 2 is a diagram indicating an alternative arrangement.

Referring to Figure 1, an oscillating triode valve 11 has a filament 12 connected to filament current supply 13 and to earth at 14; in the valve illustrated the filament also acts as the cathode of the valve; it also has the usual grid 15 and anode 16. This valve forms part of a high-frequency oscillator circuit of any standard form. For example the anode 16 may be connected to H. T. positive 17 through switch 62 and inductance 18, and the anode 16 and grid 15 may be in circuit with two capacitances 19 and 20 and two inductances 21 and 22 earthed at their junction. The dotted symbol 61 indicates the capacitance between the anode and the grid.

The welding electrodes in the case illustrated are rollers or wheels 32, 33 supplied through conducting brushes 34, 35 connected respectively to the opposite ends of coil 36 which is inductively coupled to the coils 21, 22 of the oscillator circuit, and the coil 37 of variable inductance between brush 35 and coil 36 allows the electrode circuit to be tuned or matched to the oscillator circuit.

Coming now to the commutator circuit, its object is to ensure that on the one hand the supply of electrical energy at radio frequency shall be in pulses as above described but on the other hand when the welding movement stops (and the commutator consequently stops) the result shall not be a continued supply of electrical energy which might result in the burning or fusing of the plastic between the electrodes. Any potentials of radio frequency in the grid circuit are almost entirely prevented from reaching the commutator circuit by virtue of the blocking action of the choke 24. Any residual radio frequency potential which gets past the choke 24 and resistance 25 will take the shortest path to the filament through condenser 26 instead of flowing into the commutator circuit. The commutator has two diametrically opposed brushes 27 and 28, the first brush 27 being connected to the grid 15 through choke coil 24 and resistance 25 while the second brush 28 is connected to the earthed side of the filament 12 through resistance 29. The commutator segment 30 occupies an arc small enough to permit both brushes 27 and 28 to be disconnected from it simultaneously at some portion of the rotation of the commutator and the segment 30 is connected to the earthed side of the filament 12 through capacitance 31. The condenser 31 has adequate capacity to cause any negative potential on the grid 15 to rise well into the range of less negative potentials at which the valve 11 can oscillate. This may be expressed in another way by saying that when the brush 27 and segment 30 are in contact a certain number of electrons leave the grid 15 and enter the condenser 31, thus charging the latter. If no more electrons were to arrive in the grid 15 from the filament 12 the grid potential would reach a steady value equal to the final potential of condenser 31. This potential would be lower, the greater the capacity of condenser 31. The commutator 23 is operatively connected to the roller electrodes 32, 33, the feed rollers or equivalent means of effecting the relative movement between the welding electrodes and the material to be welded, that is to say, any change in the speed of the work feed mechanism causes a change in the speed of the commutator.

The operation of the device just described is as follows: Assume that the commutator is rotating clockwise. Consider the instant when the segment 30 has not yet reached the brush 27, then the valve 11, if initially oscillating will deliver some electrons from the main electron stream to the grid 15. These, having no means of leaking away, will build up a negative grid potential which will grow in value and stop the oscillation by preventing any electrons passing from the cathode 12 to the anode 16. Now assume that the segment 30 comes in contact with the brush 27. The grid electrons now begin to charge the condenser 31. The grid potential therefore becomes less negative and the valve begins to oscillate again. However, as the condenser 31 is charged, the flow of electrons to it from the grid 15 slows down and the grid potential ceases to rise and starts to become more negative again, since the renewed electron stream inside the valve again delivers electrons to the grid 15. The valve will therefore stop oscillating of its own accord. Provided that the rate of rotation of the commutator is not so great as to sever connection between the grid 15 and the condenser 31 before the valve has ceased oscillating of its own accord, the time during which oscillation takes place and the manner in which the oscillations die away will depend only on the electrical constants of the circuit and not on the rate of commutator rotation. The high-frequency energy is therefore delivered as a pulse of constant energy-content.

As the rotation continues, the brush 27 breaks contact with the segment 30. Next the segment 30 comes in contact with the brush 28, thus allowing the condenser 31 to discharge through the resistance 29 to filament 12. The value of the resistance 29 determines the value of the potential on condenser 31 when the latter is next connected to the grid 15 by the commutator. If the resistance 29 is very large the potential on the condenser will make the grid 15 somewhat negative, with the result that the time taken for the condenser 31 to recharge to the point where oscillation ceases is short. Reducing the value of resistance 29 has the opposite effect. Variation of resistance 29 therefore affords a means of varying the size of individual pulses, as does also variation of the capacity of condenser 31. The resistance 29 is inserted for the additional purpose of decreasing sparking when contact between brush 28 and segment 30 is broken. When the segment 30 next comes in contact with the brush 27, the condenser 31 is ready to drain off the accumulation of electrons on the grid 15 and to re-start oscillation so that the cycle repeats itself and in the complete cycle one pulse of invariable energy-content is delivered for each segment of the commutator. The commutator is suitably coupled with the feed rollers or equivalent in such a way that one commutator segment is associated with one unit length of plastic material passing between the electrodes. Thus one pulse of energy is delivered for each unit length of plastic seamed, irrespective of the velocity of welding. The size of the pulses delivered can be determined initially by matching the welding load to the oscillator, by tuning the load and by choosing certain values for the various electrical elements of the circuit. These factors will remain invariable until changed by the operator to suit different materials.

Referring to Figure 2, the electrodes in the form of rollers 32, 33, or the feed rollers controlling the passage of the plastic sheets between the electrodes, are operatively connected to a commutator 40. This commutator 40 is a wheel of non-conducting material on the rim of which are a number of conducting segments. Each segment is electrically connected to a common collecting ring or hub 41, in turn electrically connected to a source of direct current 39 by means of a brush 42 in the manner of the brush gear of an electric motor. The segments, by the rotation of the commutator 40, are successively brought in contact with a segment brush 43 also in electrical contact with the rest of the apparatus. The operative connection between the feed and the commutator is such that the passage of each unit length of plastic material between the electrodes causes one or some greater invariable number of segments to come successively in contact with the brush 43, only one segment making contact at a time. The movements just described cause a unidirectional current of suitable intensity to be alternately stopped and started in the primary winding 44 of a suitable transformer. These are the primary pulses and may be of long or short duration, according to the speed of rotation of the commutator.

The primary pulses in winding 44 cause secondary pulses to appear in the secondary winding 45 of the transformer. The rate at which the primary pulses rise to full intensity when switched on by the commutator depends only on the electrical constants of the circuit; as does also the rate of fall to zero intensity when the current is subsequently broken. The maximum intensity is also invariable provided that the rate of switching is not so fast as to break the rising current before it has reached full intensity.

As a result of the constancy of the rates of rise and fall of primary current and also of the constancy of the maximum current intensity, the secondary pulses in any one direction are of constant duration and intensity. A rectifier 46 is placed in series with the secondary transformer winding 45 the purpose of which is to suppress half the secondary pulses, leaving only pulses travelling in a single direction around the circuit, one pulse per segment of the commutator. The secondary pulses are now fed into that part of the network which regulates the generator. In the form shown in Figure 2 these pulses are fed to the grid 47 and cathode 48 of a gas-filled relay in such a way as to make the grid 47 electrically more positive with respect to the cathode 48 every time a pulse appears. The gas-filled relay must be of the type in which the controlling action of the grid potential on the anode current is never lost, so that the anode current may be varied by altering the grid potential alone at all times. The grid 47 is made normally negative by means of a grid bias supply 147 in well-known manner. The cathode (filament) 48 of the gas-filled relay is connected to filament supply 148. The electrical path between the anode 49 and the cathode 48 of the relay is thus normally of such high resistance as to be virtually non-conducting. When a pulse increases the potential of the grid 47, the resistance of the anode-cathode path becomes relatively very low. As shown, the anode 49 of the relay is connected to the cathode 50 of the power oscillator 51 while the cathode 48 of the relay is connected to the grid 52 of the power oscillator through the choke coil 38 and the grid leak resistance 53. The filament 50 is connected to filament supply 150 and the grid 52 is connected to grid bias supply 152. The oscillator valve 51 is normally in the non-oscillating condition due to the building up of electrons on the grid 52 of the oscillator valve to give a high negative potential. Since the grid leak resistance 53 is connected to the relay which is normally non-conducting, this negative charge has no opportunity of leaking away. When, however, a secondary pulse makes the relay electrically conducting, the negative charge on grid 52 can leak back to the cathode 50 of the oscillator valve 51 via the grid leak 53 and the relay. The valve 51 now starts oscillating and delivers power to the welding electrodes. The anode 54 of the oscillator valve 51 is connected to high-tension positive at 55 through coil 56. The grid 52 and anode 54 of oscillator valve 51 are connected in an oscillatory circuit of standard form containing two condensers 57, 58 and two inductances 59 and 60 earthed at their junction. The dotted symbol 63 indicates the capacitance between the anode and the grid. A coil 36 inductively coupled to inductances 59, 60 supplies the high-frequency current to welding electrodes 32, 33 through brushes 34, 35 the brush 35 being connected to coil 36 through coil 37 of variable inductance to enable the electrode circuit to be tuned or matched to the oscillator circuit. The oscillator valve 51 continues to deliver power to the electrodes 32, 33 for as long as the relay remains conducting, i. e., for as long as voltage produced at the grid 47 of the relay by the secondary pulse remains high enough to render the relay conducting, and as has been demonstrated above, the duration of the secondary pulse is constant. The duration of the power pulse from the generator 51 is therefore also constant and the amount of power delivered to the welding electrodes is therefore a constant quantity for every pulse and therefore for every unit length of material passing between the electrodes. The welding seam thus receives an amount of heat depending only on its length and variations of speed do not cause underheating or overheating of the joining surfaces being welded.

We claim:

1. Apparatus for supplying high frequency electrical energy to electrodes for consolidating two joining faces of contiguous sheets of thermoplastic material passing between said electrodes comprising an oscillatory circuit embodying an oscillating valve having no grid leak whereby the build up of electrons on the grid during oscillation cuts off the oscillation after a definite time period, means for intermittently permitting leakage of electrons from the grid, whereby oscillation is initiated, said means for permitting leakage being operated at intervals which are dependent on the speed of relative movement between said work and said electrodes but which are never shorter than said definite time period whereby the energy supplied to said electrodes is in pulses of predetermined energy content and each unit length of material fed between the electrodes receives the same number of pulses of energy.

2. Apparatus as claimed in claim 1 wherein said means for permitting leakage from the grid comprises a capacitance and a commutator synchronized with the feed of said work to said electrodes, which commutator alternatively connects said capacitance to the grid of said oscillating valve whereby leakage from the grid to said capacitance is permitted and, after the oscillation thus initiated has ceased, disconnects the capacitance from the grid and connects it to a discharging circuit whereby said capacitance is discharged in readiness for subsequent connection to the grid circuit.

3. Apparatus as claimed in claim 2, in which the electrodes are in the form of rollers between which the work is fed.

4. Apparatus as claimed in claim 3 in which said commutator comprises a rotating segment and two brushes, said segment being rotated at a speed dependent on the rate of rotation of said rollers and being connected to said capacitance, one of said brushes being connected through a choke and resistance to the grid of said valve and the other of said brushes being connected to said discharging circuit.

5. Apparatus as claimed in claim 1, wherein said means for permitting leakage comprises a commutator synchronised with the feed of the work to the electrodes and arranged to supply to the primary winding of a transformer pulses of direct current which may be of variable duration but never so short as to cease before the rising current in the primary winding has reached full intensity, together with a secondary circuit in which the secondary pulses are rectified and supplied to the negatively biased grid of a regulator which is connected to the grid of the valve of the oscillatory circuit and is so adjusted as to be conducting only whilst receiving a secondary pulse during which period it permits leakage of electrons from the grid and hence oscillation.

6. Apparatus as claimed in claim 1, in which the electrodes are in the form of rollers between which the work is fed and wherein said means for permitting leakage comprises a commutator synchronised with the feed of the work to the electrodes and arranged to supply to the primary winding of a transformer pulses of direct current which may be of variable duration but never so short as to cease before the rising current in the primary winding has reached full intensity, together with a secondary circuit in which the secondary pulses are rectified and supplied to the negatively biased grid of a regulator which is connected to the grid of the valve of the oscillatory circuit and is so adjusted as to be conducting only whilst receiving a secondary pulse during which period it permits leakage of electrons from the grid and hence oscillation.

7. Apparatus as claimed in claim 1 in which the electrodes are in the form of rollers between which the work is fed and wherein said means for permitting leakage comprises a commutator synchronised with the feed of the work to the electrodes and arranged to supply to the primary winding of a transformer pulses of direct current which may be of variable duration but never so short as to cease before the rising current in the primary winding has reached full intensity, together with a secondary circuit in which the secondary pulses are rectified and supplied to the negatively biased grid of a gas filled regulator which is connected to the grid of the valve of the oscillatory circuit and is so adjusted as to be conducting only whilst receiving a secondary pulse during which period it permits leakage of electrons from the grid and hence oscillation.

8. Apparatus as claimed in claim 1 comprising electrodes in the form of rollers between which the work is fed, a receiving circuit for passing the energy to the electrodes, an oscillatory circuit containing a valve for producing and supplying energy to the receiving circuit, a gas filled regulator having a negatively biased grid which controls the leakage of electrons from the grid to the oscillatory valve, a secondary circuit of which the regulator forms part and a primary circuit embodying a supply of direct current and a segmented commutator synchronised with the electrodes and arranged to supply to the primary winding of a transformer in the primary circuit pulses of direct current which may be of variable duration but never so short as to cease before the rising current in the primary winding has reached full intensity, the secondary pulses thus formed in the secondary circuit being rectified and supplied to the negatively biased grid of the regulator which is thereby rendered conducting and so permits leakage of electrons from the grid of the oscillatory valve and hence initiates oscillation in the oscillatory circuit so that energy is supplied to the electrodes in pulses of predetermined energy content.

9. In heating apparatus in which the work to be heated is moved past energy applying means supplied with high frequency electrical energy, the combination of a high frequency, constant pulse-length, electrical pulse-generator, means for applying the output of said generator to said energy applying means, triggering means for said generator whereby pulse initiation is effected, and means controlled by the speed of movement of the work past said energy applying means for operating said triggering means at a repetition frequency substantially proportional to said speed.

10. Apparatus for seam-welding joining faces of contiguous sheets of thermoplastic material comprising at least a pair of electrodes, means for moving the contiguous sheets between said electrodes, a high-frequency, constant pulse-length, electrical pulse-generator, means for applying the output of said generator to said electrodes, triggering means for said generator, whereby pulse initiation is effected, and means controlled by the speed of movement of the sheets past said electrodes for operating said triggering means at a repetition frequency substantially proportional to said speed.

References Cited in the file of this patent

UNITED STATES PATENTS

| Number | Name | Date |
|---|---|---|
| 1,315,239 | Pierce et al. | Sept. 9, 1919 |
| 1,438,867 | Schroder | Dec. 12, 1922 |
| 1,613,954 | Knoop | Jan. 11, 1927 |
| 1,784,610 | Numans | Dec. 9, 1930 |
| 2,103,362 | Hansell | Dec. 28, 1937 |
| 2,106,831 | Dawson | Feb. 1, 1938 |
| 2,231,457 | Stephen | Feb. 11, 1941 |
| 2,276,994 | Milinowski | Mar. 17, 1942 |
| 2,298,210 | Gulliksen | Oct. 6, 1942 |
| 2,298,240 | Toepfer | Oct 6, 1942 |
| 2,323,349 | Odquist | July 6, 1943 |
| 2,324,068 | Crandell | July 13, 1943 |
| 2,391,086 | Crandell | Dec. 18, 1945 |
| 2,432,412 | Hacklander | Dec. 9, 1947 |
| 2,477,040 | Brown et al. | July 26, 1949 |
| 2,477,313 | Quayle et al. | July 26, 1949 |